(12) United States Patent
Caputo et al.

(10) Patent No.: US 7,646,857 B2
(45) Date of Patent: Jan. 12, 2010

(54) SYSTEMS AND METHODS FOR PROVIDING VOICEMAIL SERVICES INCLUDING CALLER IDENTIFICATION

(75) Inventors: Edward J. Caputo, Fairfax, VA (US); Steven C. Johnson, Bethesda, MD (US)

(73) Assignee: Verizon Business Global LLC, Basking Ridge, NJ (US)

( * ) Notice: Subject to any disclaimer, the term of this patent is extended or adjusted under 35 U.S.C. 154(b) by 638 days.

(21) Appl. No.: 11/132,363

(22) Filed: May 19, 2005

(65) Prior Publication Data

US 2006/0262912 A1    Nov. 23, 2006

(51) Int. Cl.
*H04M 1/64* (2006.01)
(52) U.S. Cl. .................................. 379/88.19; 379/88.23
(58) Field of Classification Search .............. 379/88.19, 379/88.23, 88.14, 88.26, 88.12
See application file for complete search history.

(56) References Cited

U.S. PATENT DOCUMENTS

| | | | | |
|---|---|---|---|---|
| 5,377,354 | A * | 12/1994 | Scannell et al. | 718/103 |
| 6,456,700 | B1 * | 9/2002 | Malik | 379/88.19 |
| 6,961,410 | B1 * | 11/2005 | Castagna | 379/88.23 |
| 7,248,857 | B1 * | 7/2007 | Richardson et al. | 455/413 |
| 7,324,802 | B2 * | 1/2008 | Jennings | 455/404.1 |
| 2006/0230117 | A1 * | 10/2006 | Gross et al. | 709/207 |

* cited by examiner

*Primary Examiner*—Huyen D Le
*Assistant Examiner*—Amal Zenati

(57) ABSTRACT

A method for providing voicemail services includes receiving a voicemail message from a calling party and intended for a called party. The method further includes identifying a name associated with the calling party and storing the name associated with the calling party with the voicemail message.

30 Claims, 5 Drawing Sheets

| TELEPHONE NUMBER 310 | NAME 320 |
|---|---|
| 5551234567 | ROBERT JONES |
| 5559876543 | JANE SMITH |
| ... | |
| | |

SYSTEMS AND METHODS FOR PROVIDING VOICEMAIL SERVICES INCLUDING CALLER IDENTIFICATION

FIELD OF THE INVENTION

Implementations consistent with the invention relate generally to communication services and, more particularly, to voice messaging services.

BACKGROUND OF THE INVENTION

Conventional voicemail systems receive, store and provide voicemail messages for subscribers of the voicemail service. A "subscriber" is typically a person that has a relationship with the provider of the voicemail service. For example, the voicemail service may be provided by the local telephone company through which the subscriber receives local telephone service.

A problem with conventional voicemail services occurs when a subscriber wishes to retrieve his/her messages. For example, when a subscriber wishes to retrieve his/her messages, the subscriber typically calls a telephone number associated with the voicemail service and retrieves each message in the order in which the messages were stored. Therefore, the subscriber must listen to at least a portion of each message to determine who has left the message. Such a retrieval system is time consuming when a large number of messages have been stored.

SUMMARY OF THE INVENTION

According to one aspect of the invention, a method for providing voicemail services is provided. The method receiving a voicemail message from a calling party and intended for a called party. The method further includes identifying a name associated with the calling party and storing the name associated with the calling party with the voicemail message.

According to another aspect of the invention, a system that includes at least one network device is provided. The network device is configured to receive a call from a calling party, where the call is intended for a called party. The network device is also configured to provide a prompt to the calling party instructing the calling party to leave a voice message and store a voice message from the calling party. The network device is further configured to identify a name associated with the calling party and store the name associated with the calling party.

A further aspect of the invention provides a method that includes storing a plurality of voice messages intended for a called party. The method also includes storing a plurality of names associated with the plurality of voice messages, where each one of the plurality of names is associated with one of the respective plurality of voice messages. The method further includes providing the plurality of names associated with the plurality of voice messages to the called party.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 illustrates an exemplary database that may be associated with the directory server of FIG. 1 in an implementation consistent with the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary System

Figure 1:
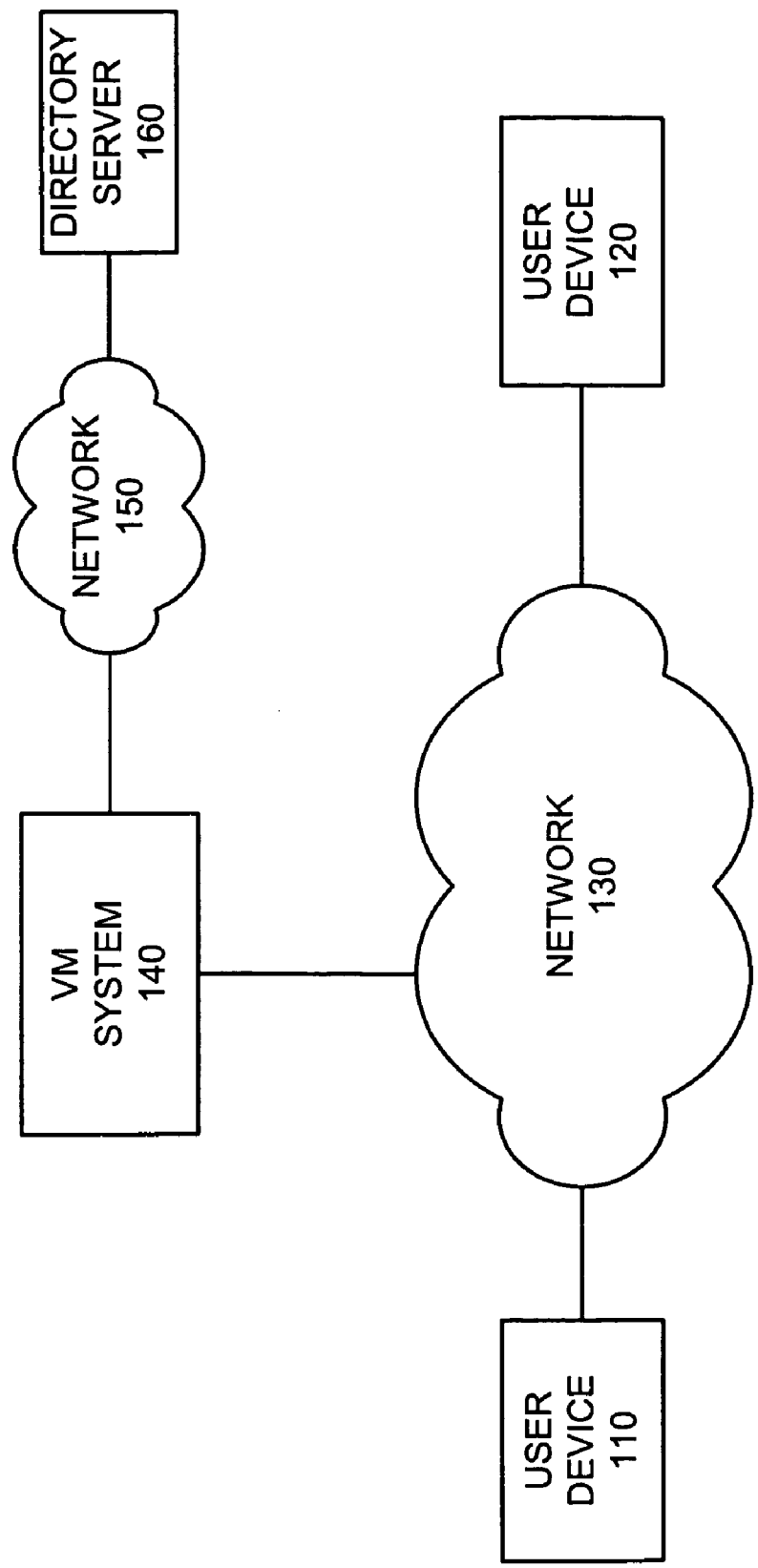
FIG. 1 illustrates an exemplary system in which methods and systems consistent with the invention may be implemented.

FIG. 1 illustrates an exemplary system in which methods and systems consistent with the invention may be implemented. Referring to FIG. 1, system 100 may include user devices 110 and 120, networks 130 and 150, voicemail (VM) system 140 and directory server 160. The number of elements and networks illustrated in FIG. 1 is provided for simplicity. In practice, a typical system could include more or fewer elements and networks than illustrated in FIG. 1.

User devices 110 and 120 may each include any device or combination of devices capable of transmitting voice signals to a network, such as network 130. In one implementation, user devices 110 and 120 may include any type of telephone system/device, such as a plain old telephone system (POTS) telephone, a session initiation protocol (SIP) telephone, a wireless telephone device (e.g., a Personal Communications System (PCS) terminal that may combine a cellular radiotelephone with data processing, facsimile, and data communications capabilities, a Personal Digital Assistant (PDA) that can include a radiotelephone, a pager, an Internet/intranet access, a Web browser, an organizer, a calendar, and/or a global positioning system (GPS), or the like), etc. In another implementation, user devices 110 and 120 may include a type of computer system, such as a mainframe, minicomputer, personal computer, a laptop, or the like. User devices 110 and 120 may connect to network 130 via any conventional technique, such as wired, wireless, or optical connections.

Networks 130 and 150 may each include a local area network (LAN), a wide area network (WAN), a telephone network, such as the Public Switched Telephone Network (PSTN), an intranet, the Internet or a combination of networks. In one implementation consistent with the invention, network 130 may include a PSTN, the Internet and/or a long distance telephone network. In this implementation, network 130 may include one or more end offices, central offices (COs) and associated switches. Network 130 may also include one or more tandem switches, such as a Class 4 switch that may act as a point of presence for interfacing to a long distance network, etc.

In an exemplary implementation consistent with the invention, network 150 may include a LAN and/or a WAN that connects VM system 140 to directory server 160. In alternative implementations, VM system 140 may connect directly to directory server 160.

VM system 140 may include one or more network devices (e.g., voicemail servers/platforms) that perform voicemail services, such as receiving, storing, and providing voicemail messages to subscribers. For example, VM system 140 may include an automated response unit (ARU) and automatic call distributor (ACD) that provide a greeting to a caller and prompt the caller to leave a message.

In one implementation, VM system 140 may include one or more VM client devices/interfaces and one or more VM application servers. In this implementation, the VM client device/interface may receive calls from, for example, user device 110 via network 130, and forward the calls to a VM application server via a network, such as a LAN (not shown). In this implementation, the VM client device/interface and the VM application server may communicate with each other via wired, wireless, or optical connections. Alternatively, the VM client device/interface and the VM application server may be directly connected. In another alternative, the VM client device/interface and the VM application server functions may be implemented in a single device or platform.

Directory server 160 may represent one or more servers that stores information regarding various telephone numbers. For example, directory server 160 may include a database that lists telephone numbers across the United States and, optionally, outside the United States, and user names associated with the respective telephone numbers. Directory server 160 may also include other databases that store telephone numbers and names associated with the telephone numbers.

For example, directory server 160 may include a company database that identifies telephone numbers within a particular company and corresponding names assigned to the telephone numbers within the company. Directory server 160, as described in more detail below, may also include a processing device that receives queries from systems/parties external to directory server 160 and identifies the appropriate information stored in directory server 160 based on the particular query. While only one directory server 160 is illustrated in FIG. 1, in alternative implementations, a number of directory servers 160 may be included in system 100.

While VM system 140 and directory server 160 are shown as separate elements connected via network 150, in alternative implementations, VM system 140 may be directly connected to directory server 160. In still other alternative implementations, VM system 140 may perform the functions of directory server 160 and may include one or more databases similar to those described in detail below.

Figure 2:
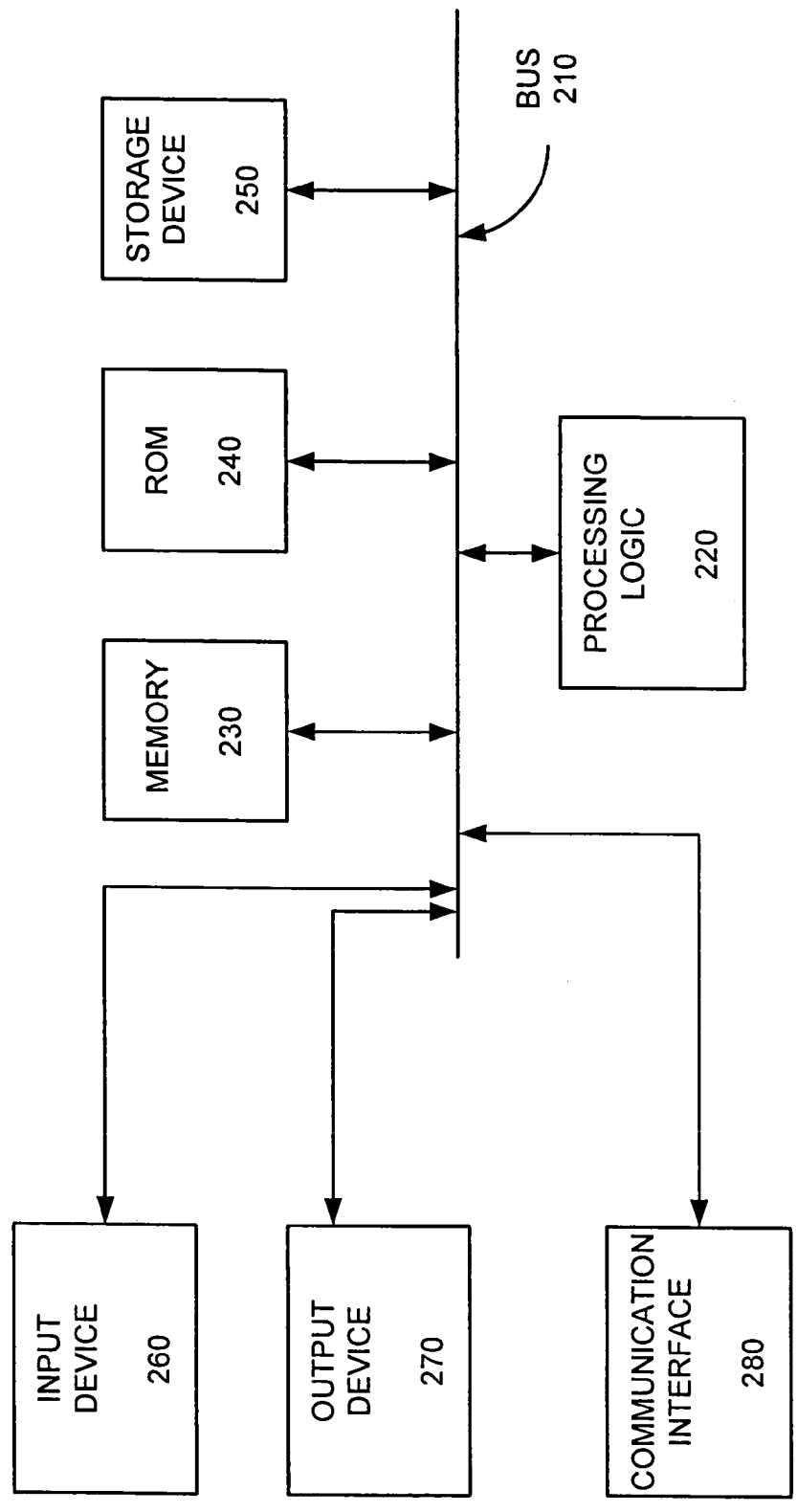
FIG. 2 illustrates an exemplary configuration of the voicemail system of FIG. 1 in an implementation consistent with the invention.

FIG. 2 illustrates an exemplary configuration of VM system 140 in an implementation consistent with the invention. Referring to FIG. 2, VM system 140 may include a bus 210, processing logic 220, a memory 230, a read only memory (ROM) 240, a storage device 250, an input device 260, an output device 270, and a communications interface 280. It will be appreciated that VM system 140 may include other components (not shown) that aid in receiving, transmitting, and/or processing voicemail messages.

Bus 210 may permit communication among the components of VM system 140. Processing logic 220 may include any type of conventional processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220. ROM 240 may include a conventional ROM device and/or another type of static storage device that stores static information and instructions for processing logic 220. Storage device 250 may include a magnetic or optical recording medium and its corresponding drive for storing information and/or instructions.

Input device 260 may include a conventional device that permits an operator to input information to VM system 140, such as a keyboard, a keypad, a mouse, a pen, a microphone, one or more biometric mechanisms, and the like. Output device 270 may include a conventional device that outputs information to the operator, including a display, a printer, a speaker, etc.

Communication interface 280 may include any transceiver-like mechanism that enables VM system 140 to communicate with other devices and/or systems. For example, communication interface 280 may include mechanisms for communicating with another device or system via a network, such as network 130 or 150.

VM system 140, consistent with the invention, may perform voicemail services, as described in detail below. VM system 140 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the invention are not limited to any specific combination of hardware circuitry and software.

Referring back to FIG. 1, in an exemplary implementation, directory server 160 may be configured in a similar manner as VM system 140 illustrated in FIG. 2. For example, directory server 160 may include processing logic, a RAM, a ROM, a storage device, an input device, an output device, a communication interface and a bus that permits communication among the components of directory server 160. As described in detail below, directory server 160 may facilitate retrieval of information associated with telephone numbers.

FIG. 3 illustrates an exemplary database 300 that may be associated with directory server 160 in an implementation consistent with the invention. Database 300 may be stored in, for example, a storage device within directory server 160 or may be located externally from directory server 160. Referring to FIG. 3, database 300 may include a telephone number field 310 and a name field 320. It should be understood that database 300 may include additional fields (not shown) that provide information associated with a telephone number. Telephone number field 310 may store an identifier associated with a user device, such as user device 110 or 120. The identifier may include, for example, a unique group of characters.

For example, the identifier may include a 10 digit telephone number that is associated with a user device (e.g., user device 110, 120, etc.). Name field 320 may store information associated with the telephone number in field 310, such as the name of the party to whom the corresponding telephone number in field 310 has been registered or assigned by a telephone service provider. For example, referring to FIG. 3, the telephone number 555-123-4567 in the first entry in database 300 corresponds to the name Robert Jones. This indicates that the telephone number 555-123-4567 has been assigned to Robert Jones. It should be understood that database 300 may contain additional fields (not shown) that provide information associated with a telephone number.

In addition, while only one database 300 is described above, it will be appreciated that database 300 may consist of multiple databases stored locally at directory server 160 or stored at different locations accessible by directory server 160. Moreover, if a number of directory servers 160 are present, each directory server 160 may be associated with a separate database 300 or database 300 may be associated with each of the multiple directory servers 160.

For example, if multiple directory servers 160 are present in system 100, each directory server 160 may be associated with a particular geographical region. In this case, a database (e.g., database 300) that stores telephone numbers and names assigned to those telephone numbers in that geographical region may be coupled to the directory server 160 associated with that geographic region.

In other implementations consistent with the invention, database 300 may be associated with one or more other devices in system 100. For example, database 300 may be associated with VM system 140 and may be directly accessible by VM system 140. For example, database 300 may be operated/maintained by the same entity that operates VM system 140.

Exemplary Processing

Figure 4:
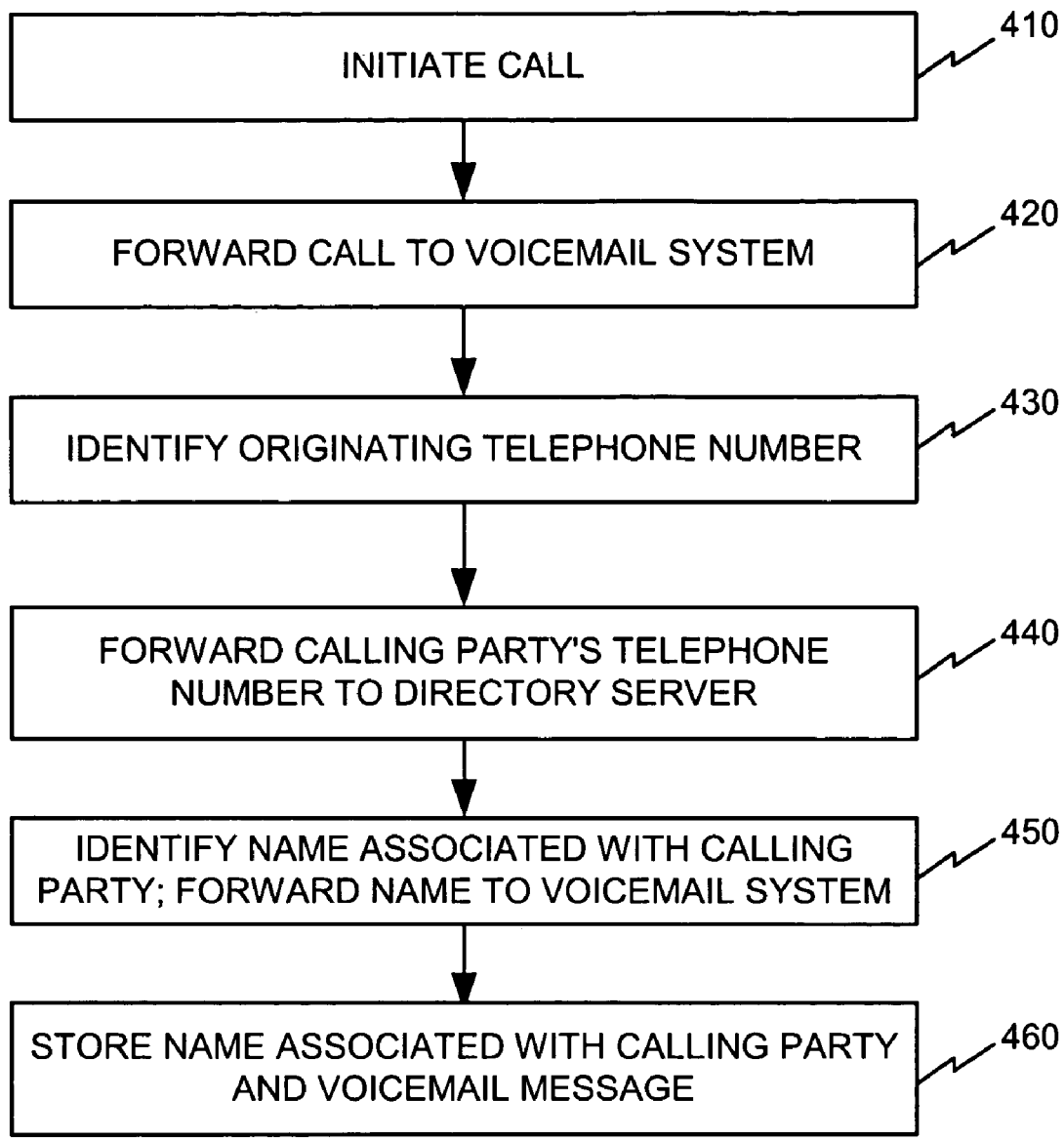
FIG. 4 illustrates an exemplary process for receiving and storing voicemail messages and name information in an implementation consistent with the invention.

FIG. 4 illustrates an exemplary process for receiving and storing voicemail messages in an implementation consistent with the invention. Processing may begin with a calling party at a user device, such as user device 110, initiating a call to a party (referred to as the "called party") at, for example, user device 120 (act 410). The calling party may initiate the call by, for example, dialing a telephone number associated with user device 120.

Assume that the called party has subscribed to voicemail services provided by VM system 140. Further assume that the called party does not answer the call from the calling party. After a predetermined number of rings without an answer, a CO in network 130 may forward the call to a VM system, such as VM system 140 (act 420).

The CO in network 130 may be provided with a telephone number to which the call is to be forwarded after the predetermined number of rings. For example, an entity associated with VM system 140 may provide the local exchange carrier (LEC) operating the CO in network 130 to which user device 120 is coupled with a toll free number associated with VM system 140 (e.g., an '800' number corresponding to a bridging switch associated with VM system 140). In an exemplary implementation, the LEC that forwards the call to VM system 140 may be unaffiliated with the entity that operates VM system 140. That is, VM system 140 may be operated by an entity that provides voicemail services to the subscriber at user device 120, but does not provide local phone service to that subscriber. In some implementations, VM system 140 may be operated by an inter-exchange carrier (IEC) that provides long distance services via network 130.

Alternatively, VM system 140 may be affiliated with the LEC providing local telephone service to user device 120. In this case, the LEC may forward the call to a switch in its own network that is associated with VM system 140. In each case, the LEC (or other service provider) may configure the appropriate CO in network 130 to forward calls to the appropriate number after a predetermined number of rings without an answer at user device 120.

Assume that VM system 140 receives the forwarded call. VM system 140 may perform an automatic number identification (ANI) process to identify the originating telephone number (i.e., the telephone number associated with the calling party at user device 110) (act 430). Alternatively, another device in system 100, such as a local switch in network 130, may perform an ANI to identify the originating telephone number and may pass the ANI information to VM system 140 via network 130.

In either case, after the telephone number associated with the calling party is identified, VM system 140 may forward the calling party's telephone number to directory server 160 to perform a lookup using the calling party's telephone number (act 440). Directory server 160 may receive the calling party's telephone number from VM system 140 and may use this telephone number to identify a name associated with the calling party (act 450). For example, directory server 160 may access database 300 using the calling party's telephone number as an index to identify the corresponding name associated with the identified telephone number. As an example, suppose that the identified telephone number is 555-987-6543. In this case, directory server 160 accesses database 300 (FIG. 3) and identifies the calling party (or the person to whom the originating telephone number has been assigned) as Jane Smith.

After identifying the name associated with the calling party, directory server 160 may forward the name to VM system 140 (act 450). VM system 140 may, concurrently with the identifying of the name associated with the calling party, prompt the calling party to leave a message. VM system 140 may receive and store the voicemail message from the calling party along with the name associated with the calling party (act 460). For example, VM system 140 may play a prerecorded message for the calling party that prompts the calling party to leave a message. The calling party may then leave a voicemail message and VM system 140 may store the voicemail message along with the name associated with the calling party. It should be understood that in implementations consistent with the invention, VM system 140 may store the voicemail message prior to, concurrently with or after the identification and storage of the name associated with the calling party. In each case, the stored message will be linked in VM system 140 to the identified name associated with the calling party.

After VM system 140 has stored a voicemail message for a called party, such as a party associated with user device 120, the party at user device 120 may retrieve the stored voicemail messages, as described in detail below.

Figure 5:
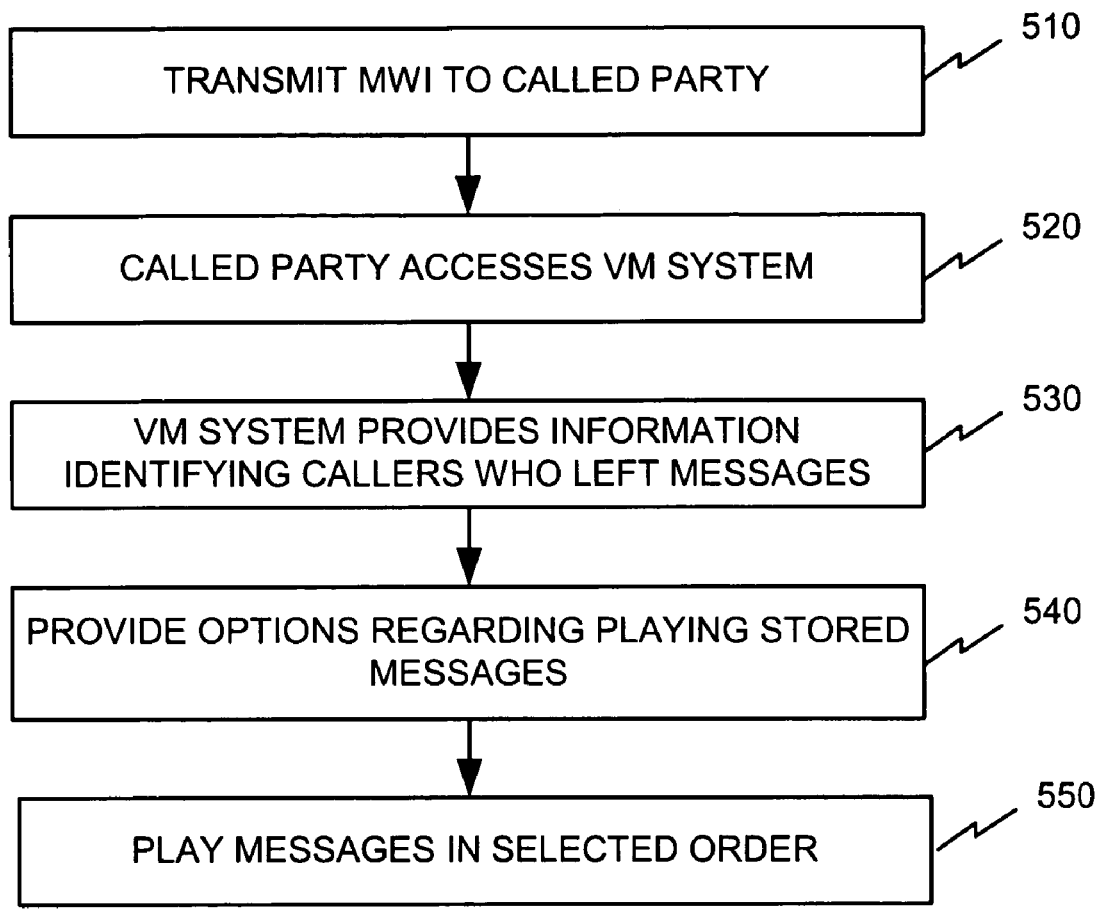
FIG. 5 illustrates an exemplary process associated with retrieving information associated with stored voicemail messages and retrieving the stored voicemail messages in an implementation consistent with the invention.

FIG. 5 illustrates an exemplary process associated with retrieving information associated with messages stored in VM system 140. Processing may begin after a calling party has left a message for the called party associated with user device 120. In this case, VM system 140 may transmit a message waiting indicator (MWI) to user device 120 (act 510).

The MWI, consistent with the invention, may include a "stutter tone" provided when user device 120 is taken off-hook. That is, when the called party takes user device 120 off-hook, a stutter dial tone may be provided for a predetermined period (e.g., one to three seconds) prior to the normal dial tone. This stutter tone indicates that a stored message is waiting for the called party at VM system 140. Alternatively (or in addition to the stutter tone), the MWI may include a visual indication provided at user device 120, such as a flashing light provided on user device 120. This type of MWI may be used, for example, in situations in which user device 120 is not a POTS device. For example, user device 120, as discussed above, may be a wireless device or a SIP telephone. In these cases, the stutter tone may not be available as an MWI and a flashing light or some other indication may be used. In each case, the called party at user device 120 is provided with an appropriate MWI so that he/she is alerted that a message is waiting. It should be understood that the CO to which user device 120 is connected may provide the MWI on a subscriber loop to which user device 120 is connected.

Assume that the called party takes user device 120 off-hook to retrieve his/her messages from VM system 140 (act 520). The called party, consistent with the invention, may dial a telephone number associated with VM system 140 or enter a pre-designated group of characters to retrieve the voicemail messages. In one implementation, the telephone number may be an "800" number. Alternatively, the party at user device 120 may enter an Internet address associated with VM system 140.

VM system 140 may request an authorization code for accessing the stored voicemail messages associated with calls to user device 120. In an alternative implementation consistent with the invention, VM system 140 may capture the telephone number associated with user device 120 without requesting an authorization code. For example, ANI techniques may be used to capture the telephone number associated with the user device 120. In this implementation, no additional authorization code may be needed and the party at user device 120 (i.e., the subscriber to the services provided by VM system 140) may be provided immediate access to his/her voicemail account.

Assume that the called party has established communications with VM system 140 and has been authorized to access VM system 140. Further assume that VM system 140 has stored a number of messages for the called party. VM system 140 may provide an introductory message to the party at user device 120 stating the number of stored messages. For example, VM system 140 may provide a message such as, "You have four messages."

VM system 140, consistent with the invention, may also provide the party at user device 120 with another message, such as a message identifying each of the parties that left a message (act 530). For example, VM system 140 may provide a message to the party at user device 120, such as, "The first stored message is from Jane Smith, the second stored message is from Robert Jones," etc. In this manner, the party at user device 120 may quickly determine who has left messages.

In addition, in some implementations, VM system 140 may provide the party at user device 120 with a visible display identifying the callers who left messages. For example, if user device 120 includes a telephone with a display area, VM system 140 may transmit text information to user device 120 that allows the names of the callers who left messages to be displayed via the display area on user device 120.

In some implementations, the party at user device 120 may not have to call a telephone number associated with VM system 140 to receive the visual display identifying the callers who left messages. For example, the party at user device 120 may press one or more characters or function keys on user device 120 to retrieve the list of callers who have left messages. In this manner, the party at user device 120 may save additional time associated with retrieving the voice messages.

VM system 140, consistent with the invention, may also provide an option to allow the called party at user device 120 to retrieve the stored messages in any particular order. For example, VM system 140 may provide a voice menu that allows the called party to select one of the names of the identified callers who left a message (act 540). VM system 140 may then play the selected caller's message without playing each message that was stored prior to the selected message (act 550).

As an example, suppose that VM system 140 provides the names Jane Smith, Robert Jones, Ed Wilson and George Taylor to the called party at user device 120, identifying four parties who left voicemail messages. VM system 140 may provide a voice menu that instructs the called party to voice any one of the identified names to retrieve the corresponding message. For example, VM system 140 may provide a message such as, "Please select a caller to hear the message from that caller." Further assume that the called party at user device 120 wishes to retrieve the message from Ed Wilson before hearing any other messages. In this case, the called party at user device 120 may voice the name Ed Wilson. Voice recognition software at VM system 140 recognizes the called party's voice input (i.e., Ed Wilson in this example) and plays Ed Wilson's voicemail message to the called party at user device 120. In this manner, the called party at user device 120 may retrieve the stored messages in any particular order.

In alternative implementations, the called party may prompt the called party at user device 120 to enter one or more inputs via a keypad on, for example, user device 120, to select a particular message. For example, VM system 140 may provide a message such as "To hear Jane Smith's message, press 1; to hear Robert Jones' message, press 2, . . . ", etc. In this manner, a called party subscribing to services provided by VM system 140 may retrieve stored messages in his/her desired order, regardless of the order in which the messages were received. This helps save additional time with respect to retrieving the stored messages.

In another implementation, the called party may associate priority information with a list of potential calling parties. The called party (i.e., the subscriber) may store the list at VM system 140. VM system 140 may then present a list of names (or the actual stored voicemail messages) to the called party based on the stored list. For example, suppose that the called party indicates that calls from his/her designated family members have the highest priority. If one of these designated family members leaves a message for the called party, the name of that called party would be presented first to the called party when the called party retrieves his/her voicemail message.

The processing described above assumes that the called party retrieves his/her messages via the user device associated with the called number (i.e., user device 120 in the example above). In alternative implementations, the called party may retrieve his/her messages via any user device that can access VM system 140. For example, the called party may retrieve messages left for him/her at his/her home telephone number using a wireless telephone or by using a telephone device at another location, such as his/her office.

In some implementations consistent with the invention, the called party may access the stored messages via a web-based user interface provided by VM system 140 or a software client that runs on, for example, a personal computer, a laptop computer, a wireless telephone, a PDA, or another device that is able to access VM system 140 via network 130. In this case, the names associated with the calling parties may be displayed to the called party via the device used by the called party to access VM system 140. In an exemplary implementation, the called party may also be able to retrieve the stored voicemail messages in any particular order using the web-based user interface or software client by selecting any one of the displayed names.

The embodiments described above assume that directory server 160 stores a name corresponding to the identified telephone number. If, however, directory server 160 does not store a name corresponding to the identified telephone number (e.g., the telephone number is unlisted), VM system 140 may provide the telephone number from which the call originated to the called party, as opposed to a name.

In other alternative embodiments, if VM system 140 is unable to identify a name associated with the identified telephone number (or instead of using ANI processing and directory server 160 to identify a name associated with a calling party, as described above), VM system 140 may prompt the calling party to leave his/her name prior to (or after) leaving the voice message. For example, VM system 140 may provide a voice prompt such as, "Please state your name and then leave a message." The calling party may voice his/her name. VM system 140 may then provide this voiced name to the called party along with the other names associated with the other calls.

In some implementations in which the calling party is prompted to voice his/her name, VM system 140 may use voice or speech recognition software to identify the calling party's voiced name. In such implementations, VM system 140 may store the name identified via the speech recognition process with names identified using directory server 160. In still other alternative implementations, name information retrieved from directory server 160 may be used to verify the name identified by the voice recognition software. For example, if the calling party voices the name "Jack Wilson," VM system 140 may use a name retrieved from directory server 160 to verify that the voice recognition software identified the correct name. In this case, if VM system 140 retrieved the name "Jack Wilson" from directory server 160, the verification process may be complete. That is, VM system 140 may compare the output of the voice recognition process to the name retrieved from directory server 160. When the names match, the verification process is complete. In situations where the names don't match (i.e., VM system 140 retrieves a different name from directory server 160 than the name generated by the voice recognition software), this may indicate that the calling party did not call from a telephone number registered to the calling party. In this case, VM system 140 may re-voice the name output from the voice recognition process to the calling party so that the calling party may verify that the correct name has been identified. In either case, VM system 140 may verify the actual calling party who placed the call.

Conclusion

Implementations consistent with the invention provide a voicemail service that identifies names associated with stored voice messages. This allows a subscriber to quickly identify the parties who have left messages. In addition, implementations consistent with the invention allow the subscriber to retrieve the messages in his/her preferred order regardless of the order in which the messages were received.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, calling parties may be prompted to voice their names, as described above, instead of, or in addition to, using directory server 160 to identify a name associated with a calling party.

In addition, while series of acts have been described with respect to FIGS. 4 and 5, the order of the acts may be varied in other implementations consistent with the invention. Further, acts described as being performed by one device above may be performed by other devices in implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a voicemail system, for providing voicemail services, comprising:
   receiving, by a processor associated with the voicemail system, priority information associated with a plurality of potential calling parties;
   storing, by the processor, the priority information in a memory associated with the voicemail system;
   receiving, by the processor, voicemail messages from more than one calling party of the potential calling parties, the voicemail messages being intended for a called party;
   identifying, by the processor, a name associated with each of the more than one calling party;
   storing, by the processor, the name associated with each calling party with the associated voicemail message in the memory;
   receiving, by the processor, a call from the called party for retrieving the stored voicemail messages; and
   audibly providing, by the processor, the names to the called party prior to providing the voicemail messages, the names being provided in an order based on the stored priority information.

2. The method of claim 1, where the identifying a name associated with each of the calling parties comprises:
   using automatic number identification to identify a telephone number associated with the calling party.

3. The method of claim 2, where the identifying a name associated with each of the calling parties further comprises:
   accessing a directory database, and
   receiving a name associated with the identified telephone number from the directory database.

4. The method of claim 3, further comprising: sending the telephone number to the directory database for obtaining the name.

5. The method of claim 1, where the identifying a name associated with each of the calling parties comprises:
prompting the calling party to provide a name.

6. The method of claim 5, further comprising:
receiving a voiced name from the calling party; and
generating a voice recognition result corresponding to the voiced name.

7. The method of claim 1,
where the storing the name associated with each call party comprises storing the name associated with a telephone number from which a respective one of the plurality of calls originated; and
where audibly providing the names to the called party comprises:
providing a name associated with a higher priority calling party prior to providing a name associated with a lower priority calling party.

8. The method of claim 7, where the audibly providing the names comprises:
providing the names without requiring the called party to listen to the stored voicemail messages.

9. The method of claim 1 further comprising, after said audibly providing the names, audibly providing, by the processer, one or more of the voicemail messages.

10. The method of claim 1, where said audibly providing the names comprises audibly providing more than one name.

11. The method of claim 1 further comprising providing a selectable option to audibly provide one or more of said messages in an order that is different from the order based on the stored priority information.

12. A system comprising:
at least one network device to:
receive a plurality of calls from a plurality of calling parties, the calls being intended for a called party,
provide a prompt to each of the calling parties instructing the calling party to leave a voice message,
store a voice message from each of the calling parties,
identify a name associated with each of the calling parties,
store the names associated with the calling parties,
receive a call from the called party for retrieving the stored voice messages, and
audibly provide, to the called party in response to the call from the called party, the names associated with the stored voice messages prior to providing the stored voice messages and in an order based on priority information provided by the called party.

13. The system of claim 12, where when identifying a name associated with each calling party, the at least one network device is to:
identify a telephone number from which the call originated, and
access an external database to identify a name associated with the identified telephone number.

14. The system of claim 13, where the at least one network device is further to:
store the identified name with the corresponding stored voice message.

15. The system of claim 12, where the at least one network device is further to:
provide the names to the called party without requiring the called party to listen to any of the stored voice messages.

16. The system of claim 12, where the at least one network device is further to:
provide the names for display on a device associated with the called party.

17. The system of claim 12, where when storing the names, the at least one network device is to:
store a name associated with a user device from which a respective one of the plurality of calls originated, and
where when providing the names, the at least one network device is to:
provide the names to the called party via an audio message.

18. A system comprising:
means for receiving a plurality of calls, each of the calls being intended for a called party;
means for identifying a name associated with each call of the plurality of calls;
means for prompting each of the calling parties to leave a message;
means for receiving a message from each of the calling parties;
means for storing the messages and the associated names; and
means for audibly providing, to the called party in response to a call for retrieving voice messages, the stored names being provided prior to providing the voicemail messages, the names being provided in an order based on priority information provided by the called party.

19. The system of claim 18, where the means for identifying comprises:
means for identifying a number associated with a location from which a call originated, and
means for accessing a database to identify a name associated with the number.

20. The system of claim 18, further comprising:
means for providing a list of the identified names to the called party without requiring the called party to listen to any of the plurality of messages.

21. A method performed by a voicemail system, comprising:
storing, by a processor associated with the voicemail system and in a memory associated with the voicemail system, a plurality of voice messages intended for a called party;
storing, by the processor and in the memory, a plurality of names associated with the plurality of voice messages, each one of the plurality of names being associated with one of the respective plurality of voice messages; and
audibly providing, by the processor, the plurality of names associated with the plurality of voice messages to the called party, the plurality of names being provided prior to providing the voicemail messages, the names being provided in an order based on priority information provided by the called party.

22. The method of claim 21, where the providing the plurality of names comprises:
providing the plurality of names via an audible message prior to playing the plurality of voice messages for the called party.

23. The method of claim 21, where the providing the plurality of names comprises:
providing text data to a device associated with the called party.

24. The method of claim 23, where the providing text data to a device associated with the called party comprises:
providing text data corresponding to the plurality of names for display on the device.

25. The method of claim 21, further comprising:
providing the called party with an option to play the plurality of voice messages in the order provided by the called party.

26. The method of claim 21, further comprising:

receiving an input from the called party, the input identifying a particular one of the plurality of names; and providing a voice message associated with the particular name to the called party.

27. The method of claim 26, where the receiving an input comprises:

receiving at least one of a voice input identifying the first name or a keypad input corresponding to the first name.

28. The method of claim 21, further comprising:

identifying telephone numbers from which a plurality of calls associated with the plurality of voice messages originated, each telephone number being associated with one of the respective plurality of calls; and identifying a name associated with each telephone number by accessing at least one database that stores names to which the identified telephone numbers are registered.

29. The method of claim 21, where each one of the plurality of names corresponds to at least one of a telephone number associated with a location from which one of the plurality of voice messages originated, a user device from which one of the plurality of voice messages originated, or a name provided by a calling party.

30. The method of claim 21, where the providing the plurality of names comprises:

presenting the names in an order that is different from an order in which the corresponding voice messages were stored.

* * * * *